(12) United States Patent
Kinoshita et al.

(10) Patent No.: US 7,711,956 B2
(45) Date of Patent: May 4, 2010

(54) INFORMATION PROCESSING APPARATUS, INFORMATION SYSTEM, PROXY PROCESSING METHOD, AND PROGRAM AND RECORDING MEDIUM THEREFOR

(75) Inventors: Takafumi Kinoshita, Machida (JP); Akihiko Ohki, Kita-machi (JP)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/127,703

(22) Filed: May 12, 2005

(65) Prior Publication Data
US 2005/0257258 A1 Nov. 17, 2005

(30) Foreign Application Priority Data
May 14, 2004 (JP) ............................ 2004-145648

(51) Int. Cl.
H04L 29/06 (2006.01)
H04L 9/32 (2006.01)
(52) U.S. Cl. ........................ 713/168; 713/153; 713/178
(58) Field of Classification Search ................. 709/229; 713/153, 168, 178
See application file for complete search history.

(56) References Cited

U.S. PATENT DOCUMENTS

| 6,134,588 A * | 10/2000 | Guenthner et al. | 709/226 |
| 6,446,225 B1 * | 9/2002 | Robsman et al. | 714/55 |
| 6,622,167 B1 * | 9/2003 | Keesey et al. | 709/219 |
| 6,854,018 B1 * | 2/2005 | Li et al. | 709/240 |
| 7,007,092 B2 * | 2/2006 | Peiffer | 709/227 |
| 7,143,128 B1 | 11/2006 | Baweja et al. | |
| 7,376,741 B1 * | 5/2008 | Carter et al. | 709/228 |

(Continued)

FOREIGN PATENT DOCUMENTS

CN 1329312 A 1/2002

(Continued)

OTHER PUBLICATIONS

Nakamura, Motonori, "Design and Implementation of the SMTPfeed to Improve Delivery Speed of Mailing Lists", Graduate School of Economics, Kyoto University, Yoshida, Honmachi, Sakyo, Kyoto, Aug. 18, 1997, pp. 27-32 (English abstract included).

(Continued)

*Primary Examiner*—Nasser Moazzami
*Assistant Examiner*—Mohammad W Reza
(74) *Attorney, Agent, or Firm*—Ronald Kaschak; Shimokaji & Associates, P.C.

(57) ABSTRACT

Efficient access processing is performed when the service level of a server apparatus is low. There is provided a proxy apparatus including: a request sending unit for sending a first server request message based on a first client request message received from an information terminal to a destination server apparatus; a server status information storage unit for storing timeout information of the destination if a timeout of a first server request message is detected; a request monitoring unit for deciding to time out a second client request message received from an information terminal if timeout information of the destination of the second client request message is stored; and a proxy timeout response unit for sending a timeout response message corresponding to the second client request message that is decided to be timed out to the requesting information terminal.

5 Claims, 12 Drawing Sheets

U.S. PATENT DOCUMENTS

| | | | |
|---|---|---|---|
| 2002/0161995 A1* | 10/2002 | French et al. ................... | 713/2 |
| 2003/0051037 A1* | 3/2003 | Sundaram et al. ........... | 709/227 |
| 2003/0156547 A1* | 8/2003 | Peleg ......................... | 370/252 |
| 2004/0019687 A1* | 1/2004 | Ozawa et al. ............... | 709/229 |
| 2004/0249921 A1* | 12/2004 | Yamamoto .................. | 709/223 |
| 2006/0168260 A1* | 7/2006 | Hinde et al. ................ | 709/229 |

FOREIGN PATENT DOCUMENTS

| | | |
|---|---|---|
| JP | 11-120108 | 7/1998 |
| JP | 2000-357176 | 4/2000 |
| JP | 2002-197005 | 12/2000 |
| JP | 2002259338 A * | 9/2002 |
| JP | 2002259338 A | 9/2002 |

OTHER PUBLICATIONS

Hada, Hisakazu, "Proxy Servers: The Complete Settings Guide for Squid", Software Design Magazine, Jun. 1997, pp. 106-119 & title page (English abstract included).

* cited by examiner

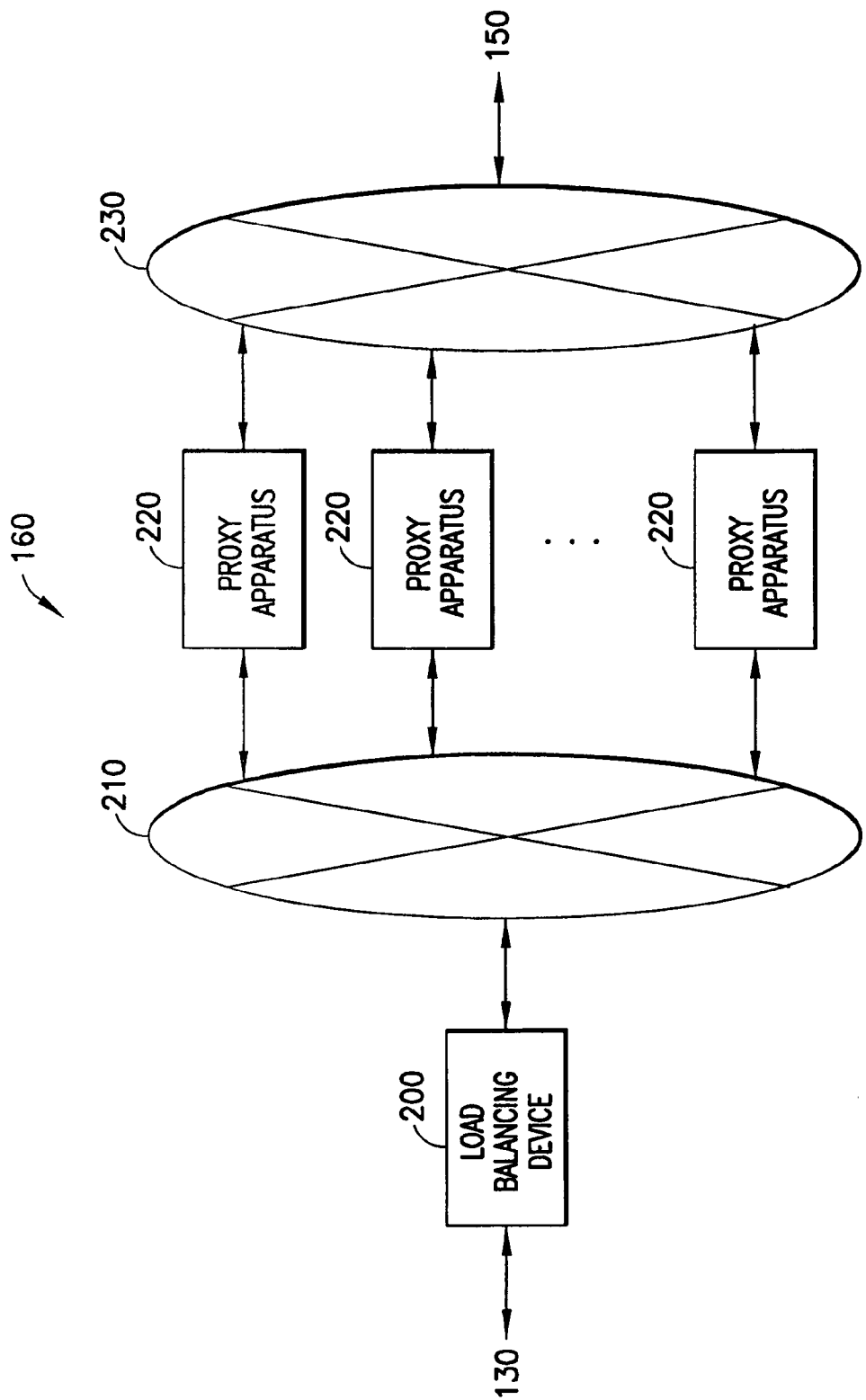

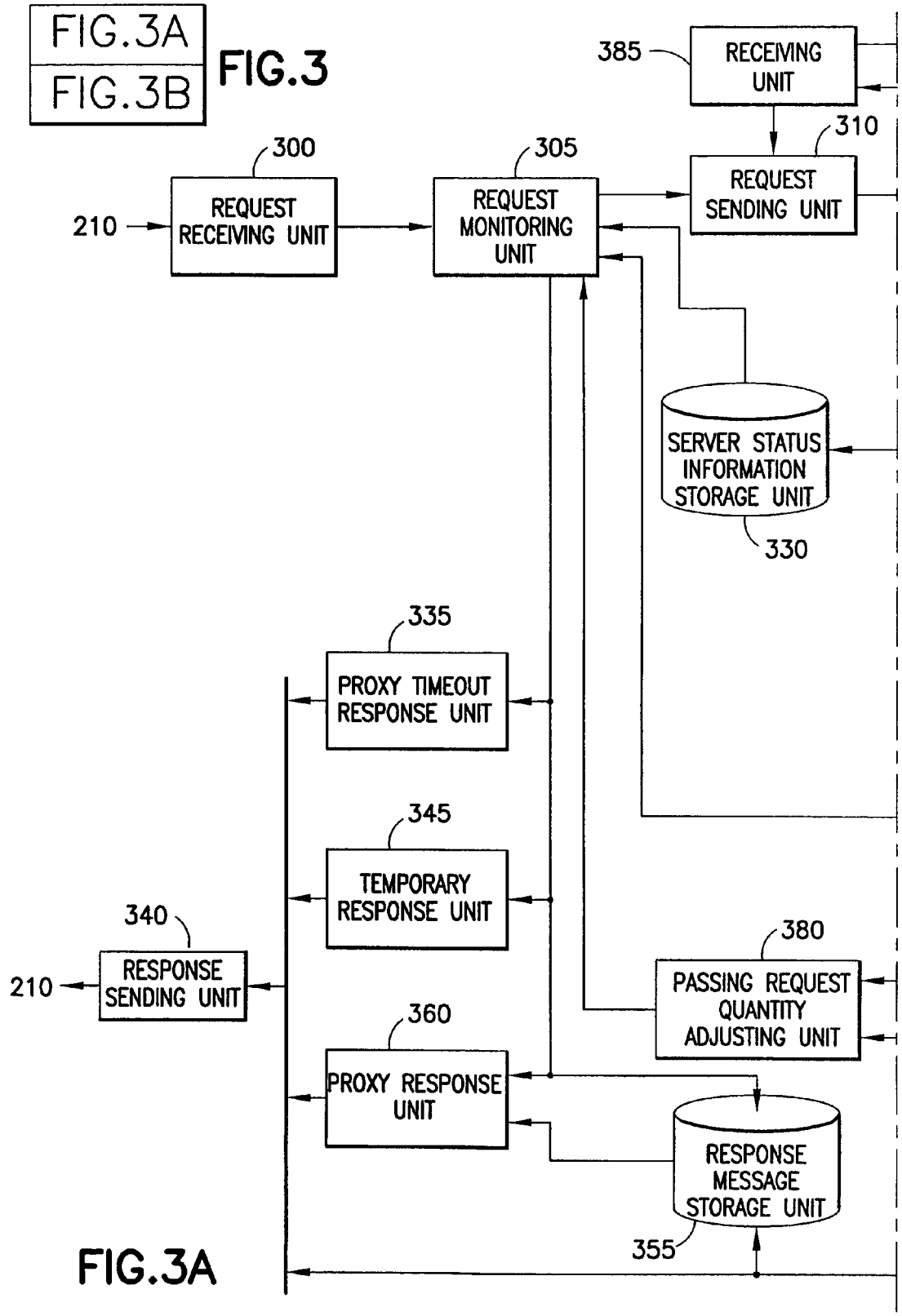

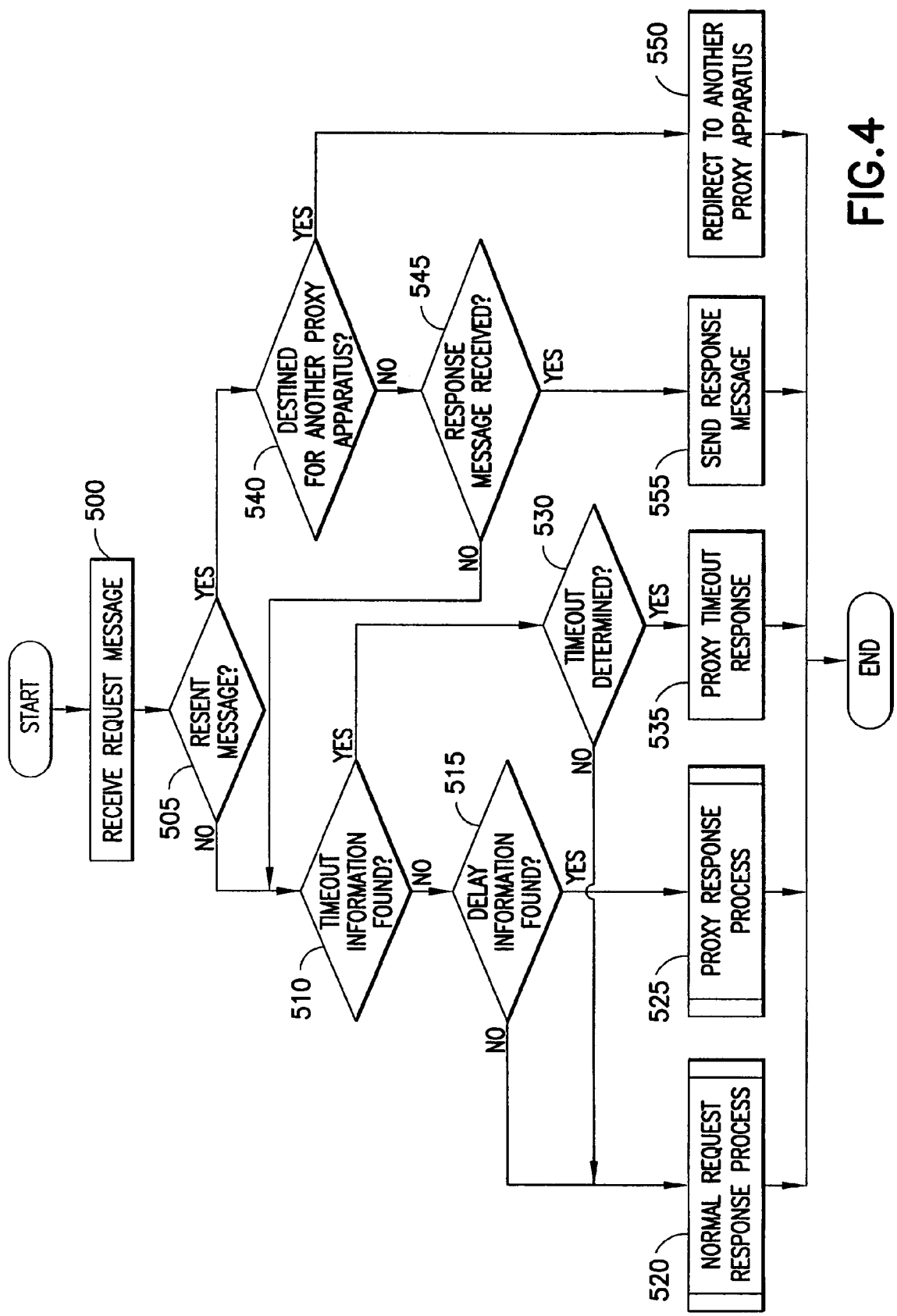

(a) http://www.abc_corp.com/whats_new/?a=b (b) Location: http://www.abc_corp.com/whats_new/?a=b&proxy_redirected=Server ID (c) <META HTTP-EQUIV ="Refresh" CONTENT="n;
URL=http://www.abc_corp.com/whats_new/?a=b
&proxy_redirected=Server ID">

FIG.7

INFORMATION PROCESSING APPARATUS, INFORMATION SYSTEM, PROXY PROCESSING METHOD, AND PROGRAM AND RECORDING MEDIUM THEREFOR

FIELD OF THE INVENTION

The present invention relates to an information processing apparatus, an information system, a proxy processing method, and a program and recording medium therefor. In particular, the present invention relates to an information processing apparatus, an information system, a proxy processing method, and a program and recording medium therefor.

BACKGROUND OF THE INVENTION

Proxy apparatuses have been used conventionally to connect wireless communication networks to the Internet in order to enable information terminals such as cellular phones, PDAs (Personal Digital Assistants) or PCs (Personal Computers) to wirelessly access server apparatuses such as Web servers on the Internet. A proxy apparatus relays traffic between information terminals and a server apparatus. The proxy apparatus receives a request message including a request to the server apparatus from an information terminal, sends it to the server apparatus, receives a response message including the result of processing of the request from the server apparatus and sends it to the information terminal. When relaying the traffic, the proxy apparatus also functions as a service gateway that provides services such as content filtering and conversion. Such apparatus is shown in Japanese Published Unexamined Patent Application No. 2000-357176.

While an information terminal is being carried by a user, wireless communication between the information terminal and Base stations (cell sites) can be temporarily broken because the user moves into an area that is in a dead zone or passes through a weak coverage area. In order to facilitate efficient communication between information terminals and a proxy apparatus under such unstable communication conditions, a method is disclosed in which a response message sent from a server apparatus in response to a request from an information terminal is temporarily stored on a proxy apparatus and the response message stored is returned to the information terminal in response to a second request from an information terminal. Such systems are shown in Japanese Published Unexamined Patent Applications No. 11-120108 and No. 2002-197005.

In internet access services to information terminals, the information terminals can send access requests to any server apparatuses. Some of such server apparatuses may provide degraded services due to slow response or suspension of services. If a proxy apparatus sends a request message to such a server apparatus for a request from an information terminal, the proxy apparatus will be kept waiting for a response message from the server apparatus for a long time or will have to cause the timeout to stop waiting for the response message. Consequently, the connection resources of the proxy apparatus are occupied for a long time, during which proper processing of access to server apparatuses is disturbed.

Therefore, an object of the present invention is to provide an information processing apparatus, an information system, a proxy processing method, and a program and a recording medium that can solve the problem. The object is achieved by the combination of features set forth in the independent Claims. The dependent Claims define further advantageous specific embodiments.

SUMMARY OF THE INVENTION

There are provided an information processing apparatus, an information processing system, a proxy processing method, a program, and recording medium relating to the information processing apparatus. The information processing apparatus includes: a request sending unit for sending, to a destination server apparatus, a first server request message based on a first client request message received from a first requesting apparatus; a server status information storage unit for storing, in response to a detection of a timeout of the first server request message, timeout information indicating that the server request message to be sent to the destination has been timed out; a request monitoring unit for deciding, if the timeout information of the destination of a second client request message received from a second requesting apparatus is stored in the server status information storage unit, to time out the second client request message; and a proxy timeout response unit for sending, instead of sending a second server request message corresponding to the second client request message that is decided to be timed out to a destination server apparatus, a timeout response message indicating that the second client request message has been timed out to the second requesting apparatus.

The summary of the invention provided above does not enumerate all essential features of the present invention. Sub-combinations of the features also can constitute the present invention.

The present invention provides an information processing apparatus and an information system capable of performing proxy processing efficiently even while the service level of a server apparatus to which a request from a requesting apparatus is sent is low.

BRIEF DESCRIPTION OF THE DRAWINGS

FIG. 2 shows a configuration of a proxy system 160 according to the embodiment of the present invention;

FIG. 4 shows an operation flow in the proxy system 160 according to the embodiment of the present invention;

FIG. 7 shows an example of the contents of a temporary response in the proxy system 160 according to the embodiment of the present invention, in which FIG. 7(a) shows an example of a request message, FIG. 7(b) shows an example of a temporary response message with a Location response header, and FIG. 7(c) shows an example of a temporary response message for directing an information terminal 100 to automatically reread a page;

DETAILED DESCRIPTION OF THE PREFERRED EMBODIMENT

While the present invention will be described below with respect to an embodiment of the present invention, the embodiment is not intended to limit the present invention which is defined in the Claims and not all of the combinations of features described in the embodiments are essential to the inventive solution.

Figure 1:
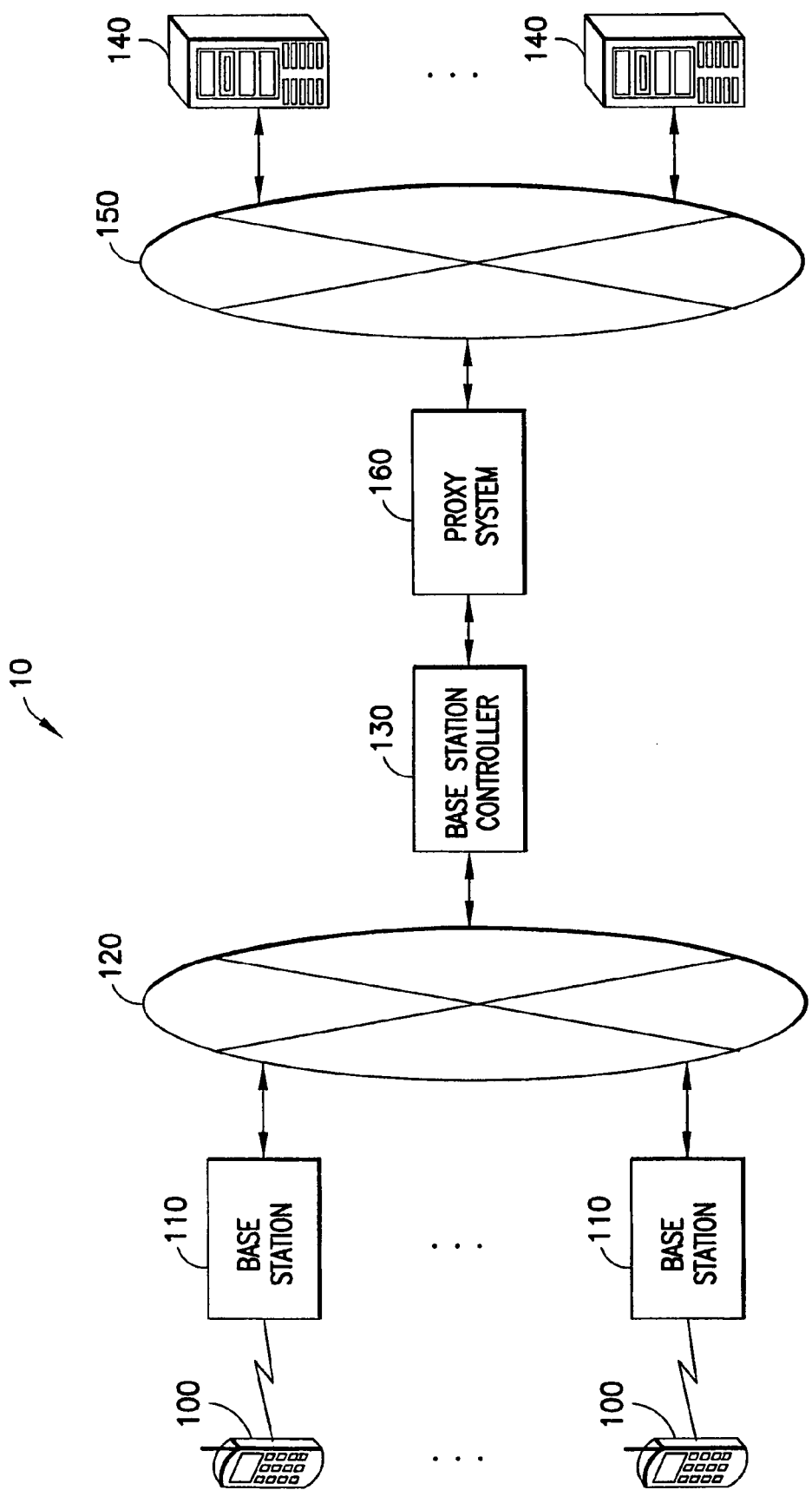
FIG. 1 shows a configuration of a communication system 10 according to an embodiment of the present invention.

FIG. 1 shows a configuration of a communication system 10 according to the present embodiment.

The communication system 10 includes one or more information terminals 100, one or more base stations 110, a carrier communication network 120, a base station controller 130, one or more server apparatuses 140, a WAN (Wide Area Network) 150, and a proxy system 160. The information terminal 100 may be a cellular phone, personal digital assistant (PDA), or personal computer (PC). The information terminal 100 sends a request message to a server apparatus 140 to request the server apparatus 140 to send a Web page or to execute a server application, receives a response message to that request message from the server apparatus 140, and displays the response. The information terminal 100 is an example of a requesting apparatus according to the present invention. Alternatively, the information apparatus 100 may be connected to the proxy system 160 through another apparatus such as a proxy apparatus that functions as a requesting apparatus according to the present invention.

The base station 110 performs wireless communications with information terminals 100. The carrier communication network 120 connects a number of base stations 110 to the base station controller 130. The base station controller 130, which is connected with the carrier communication network 120 and the proxy system 160, controls each of the multiple base stations 110 and converts protocols used between the carrier communication network 120 and the proxy system 160. The base stations 110, the carrier communication network 120, and the base station controller 130 according to the present embodiment allow each information terminal 100 to perform wireless communication with another information terminal 100 or the base station controller 130. Alternatively, the base stations 110, the carrier communication network 120, and the base station controller 130 may allow each information terminal 100 to perform wire communication.

The server apparatus 140, which may be a Web server, receives through the proxy system 160 a request message sent from each information terminal 100 and performs a task requested in the request message. The server apparatus 140 then returns a response message including the result of that task to the requesting information terminal 100 through the proxy system 160. The WAN 150, which may be the Internet, interconnects a number of server apparatuses 140 and the proxy system 160.

The proxy system 160, which is an example of an information system according to the present invention, sends to a server apparatus 140 a server request message based on a client request message received from an information terminal 100 and returns to the information terminal 100 a client response message based on the server response message returned from the server apparatus 140. The proxy system 160 may relay the messages between the information terminal 100 and the server apparatus 140 without converting the messages. Alternatively, the proxy system 160 may perform conversion between the request/response messages transmitted to and from the information terminal 100 and the request/response messages transmitted to and from the server apparatus 140. If the proxy system 160 does not convert messages, the proxy system 160 sends a client request message to the server apparatus 140 as a server request message and returns a server response message to the information terminal 100 as a client response message. If the proxy system 160 converts messages, the proxy system 160 sends one or more server request messages generated based on one or more client request messages to the server apparatus 140 and returns one or more client response messages generated based on one or more server response messages to the information terminal 100.

FIG. 2 shows a configuration of the proxy system 160 according to the present embodiment. The proxy system 160 includes a load balancing device 200, a first LAN (Local Area Network) 210, a number of proxy apparatuses 220, and a second LAN 230. The load balancing device 200 receives a client request message sent from an information terminal 100 through the base station controller 130 and redirects it to any of the multiple proxy apparatuses 220. In particular, the load balancing device 200 forwards a message to a proxy apparatus 220 among the multiple proxy apparatuses 220 that has decided to be less loaded than the others. The first LAN 210 connects the load balancing device 200 with one or more proxy apparatuses 220. Each proxy apparatus 220, which is an example of an information processing apparatus according to the present invention, receives a client request message through the load balancing device 200 and the first LAN 210 and sends a server request message based on the client request message it received to a server apparatus 140. Then, the proxy apparatus 220 receives a server response message, returned from the server apparatus 140 in response to the server request message, through the WAN 150 and the second LAN 230. Then, the proxy apparatus 220 returns a client response message based on the server response message to the information terminal 100 through the first LAN 210, the load balancing device 200, the carrier communication network 120, and the base station 110. The second LAN 230 connects one or more proxy apparatuses 220 to the WAN 150.

Figure 3B:
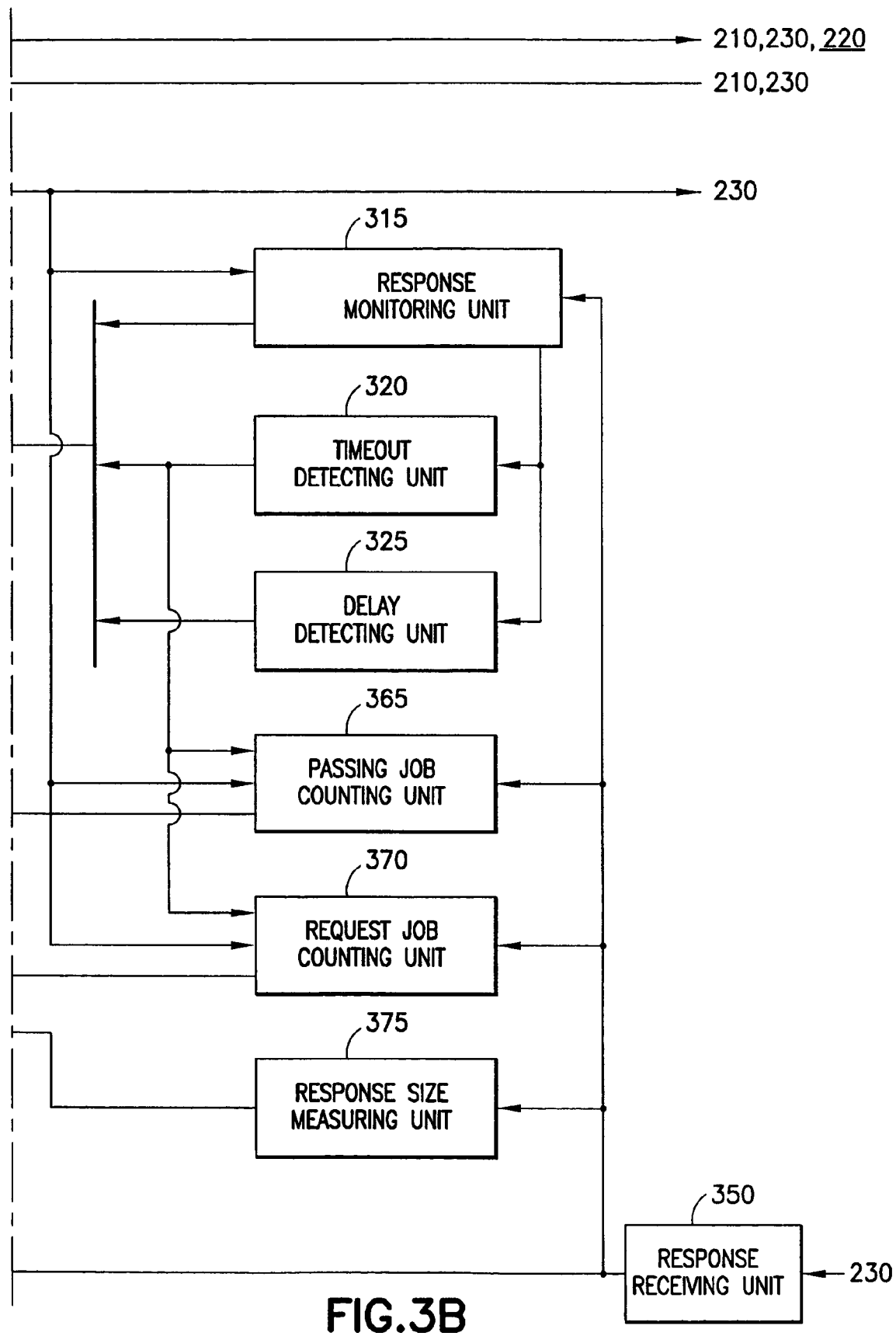
FIG. 3 shows a configuration of a proxy apparatus 220 according to the embodiment of the present invention.

FIG. 3 shows a configuration of a proxy apparatus 220 according to the present embodiment. The proxy apparatus 220 according to the present embodiment is characterized by efficiently handling access to a well-behaved server apparatus 140 while the service level of a destination server apparatus 140 is low. The proxy apparatus 220 includes a request receiving unit 300, a server status information storage unit 330, a request monitoring unit 305, a request sending unit 310, a response receiving unit 350, a response message storage unit 355, a response monitoring unit 315, a timeout detecting unit 320, a delay detecting unit 325, a proxy timeout response unit 335, a response sending unit 340, a temporary response unit 345, a proxy response unit 360, a passing job counting unit 365, a request job counting unit 370, a response size measuring unit 375, a passing request quantity adjusting unit 380, and a recovering unit 385.

The request receiving unit 300 receives a client request message sent from an information terminal 100 through the load balancing device 200 and the first LAN 210. The server status information storage unit 330 stores low-service-level information indicating the low-service state of a destination server apparatus 140 to which a server request message was sent in the past, in association with the destination. The server status information storage unit 330 according to the present embodiment stores, as low-service-level information, delay information indicating that a server response message to a server request message sent to a destination has delayed, or timeout information indicating that a server request message to a destination has timed out.

The destination in the present embodiment may be any of a destination server apparatus 140 itself, a particular directory or file on a destination server apparatus 140, a particular service or server program on a destination server apparatus 140, and a combination of a particular service or server program on a destination server apparatus 140 and a parameters to be provided to the service or server program. For example the destination may be anything indicated by a URL (Uniform Resource Locator).

The request monitoring unit 305 determines a method for processing a client request message on the basis of low-service-level information concerning the destination of that client request message received from an information terminal 100. In particular, the request monitoring unit 305 according to the present embodiment determines that a normal response should be performed if low-service-level information concerning the destination is not stored in the server status information storage unit 330. A normal response herein is a response method in which a server request message based on a client request message is sent to a destination server apparatus 140 and a client response message based on a server response message received from that server apparatus 140 is returned to the requesting information terminal 100.

The request monitoring unit 305 determines that a proxy timeout response should be performed if timeout information of the destination is stored in the server status information storage unit 330. A proxy timeout response herein is a response method in which a timeout response message indicating that a client request message has timed out is returned, instead of sending a server request message to a destination server apparatus 140.

Furthermore, the request monitoring unit 305 determines that a proxy response should be performed if delay information of the destination is stored in the server status information storage unit 330. A proxy response herein is a response method in which a temporary response message is sent to an information terminal 100 to direct it to resend a client request message, and a client response message based on a server response message which is received from a server apparatus 140 before the client request message is resent is returned to the information terminal 100 as the response message to the request message resent.

In the processes described above, the request monitoring unit 305 sends server request messages corresponding to some client request messages to destination server apparatuses 140 instead of causing the timeout of the client request messages even if timeout information of the destinations is stored in the server status information storage unit 330. Thus, the request monitoring unit 305 can use a server request message corresponding to a client request message from an information terminal 100 to detect whether a destination that caused a timeout in the past also causes a timeout at the present point in time.

In the processes described above, the request monitoring unit uses low-service-level information associated with a client request message received from a first information terminal 100 and stored in the server status information storage unit 330 to determine a method for handling a client request message received from a second information terminal 100. The first and second information terminals 100 may be the same information terminal 100 or may be different information terminals 100.

The request sending unit 310 sends to a destination server apparatus 140 a server request message based on a client request message received from an information terminal 100 if the request monitoring unit 305 determines that a server request message should be sent. The request sending unit 310 may generate the server request message by applying a process such as content conversion or content filtering to the client request message. The response receiving unit 350 receives a server response message to a server request message from a destination server apparatus 140. The response receiving unit 350 may generate a client response message by applying a process such as content conversation to the server response message. If the proxy apparatus 220 has received from the server apparatus 140 a server response message to a client request message for which the decision to perform a proxy response has been made, the response message storage unit 355 temporarily stores the client response message which is to be returned to the information terminal 100 in response to a server response message.

The response monitoring unit 315 detects whether the proxy apparatus 220 has received a server response message corresponding to a server request message sent to a server apparatus 140. If the proxy apparatus 220 has received a server response message without delay or timeout, then the response monitoring unit 315 deletes low-service-level information associated with that destination from the server status information storage unit 330.

The timeout detecting unit 320 detects the timeout of a server request message and stores the timeout information of the destination in the server status information storage unit 330 if the proxy apparatus 220 does not receive a server response request to the server request message within a preset timeout period after the proxy apparatus 220 sends the server request message. The delay detecting unit 325 detects a delay in arrival of a server request message and stores the delay information of a destination server apparatus 140 in the server status information storage unit 330 if the proxy apparatus 220 receives a server response message to the server request message after a preset delay time has elapsed since it sent the server request message to the destination server apparatus 140 but before the timeout period elapses.

The proxy timeout response unit 335 prevents a server request message corresponding to a client request message decided by the request monitoring unit 305 to be timed out from being sent to the destination server apparatus 140 but sends a timeout response message indicating the timeout of the server request message to a requesting information terminal 100 through a response sending unit 340. The response sending unit 340 performs transmission of response message to be sent from the response receiving unit 350, proxy timeout response unit 335, temporary response unit 345, and proxy response unit 360 to an information terminal 100.

The temporary response unit 345 sends to a requesting information terminal 100 through the response sending unit 340 a temporary response message that directs the information terminal 100 to resend a client request message if the request monitoring unit 305 decides that a proxy response should be performed. When a client request message is resent from an information terminal 100 that has received a temporary response message, the proxy response unit 360 sends a client response message stored in the response message storage unit 355 to the requesting information terminal 100 through the response sending unit 340, on the basis of a server response message received from a server apparatus 140 before the client request message is resent.

The passing job counting unit 365 counts passing jobs, the number of which represents the number of server request messages that were sent to a destination server apparatus 140 for which timeout information is stored in the server status information storage unit 330 and whose corresponding server response messages have not been received. Based on the number of passing jobs, the request monitoring unit 305 determines whether or not a server request message should be sent to the destination for which timeout information is stored.

The request job counting unit 370 counts request jobs, the number of which represents the number of server request messages sent to a destination server apparatus 140 and whose corresponding server response messages have not been received. The number of request jobs is equal to the number of connection resources used by the proxy apparatus 220 for communication with the server apparatus 140. The proxy apparatus 220 can use connection resources up to a predetermined upper limit. The response size measuring unit 375 takes the statistic on the size of server response messages received from each destination server apparatus 140 to which server request messages have been sent. The statistic may be the average, minimum, or maximum size. The passing request quantity adjusting unit 380 adjusts the number of server request messages to be sent to a destination for which timeout information is stored in the server status information storage unit 330, according to the number of request jobs and the size of server response messages from the destination server apparatus 140.

The recovering unit 385 communicates with a DNS (Domain Name Service) server connected to the WAN 150 through the second LAN 230 to obtain an IP address from the host name of a server apparatus 140 to which a server request message is destined. The recovering unit 385 then provides the IP address obtained to the request sending unit 310. The recovering unit 385 forwards, through the first LAN 210, a client request message resent in a proxy response process to a proxy apparatus 220 that should process the client request message.

FIG. 4 shows an operation flow in the proxy system 160 according to the present embodiment.

First, the request receiving unit 300 receives a client request message sent from an information terminal 100 (step 500). Then, the request monitoring unit 305 determines whether the received client request message is a message resent from the information terminal 100 (step 505).

If the received client request message is not a resent message (step 505: No), the request monitoring unit 305 searches the server status information storage unit 330 for timeout information or delay information concerning the destination of the client request message (steps 510 and 515).

If timeout information or delay information of the destination of the client request message is not stored in the server status information storage unit 330 (step 510: No, step 515: No), the request monitoring unit 305 determines that a normal request response process should be performed for the client request message (step 520). On the other hand, if delay information of the destination of the client request message is stored in the server status information storage unit 330 (step 510: No, step 515: Yes), the request monitoring unit 305 determines that a proxy response process should be performed for the client request message to direct the requesting information terminal 100 to resend the client request message (step 525).

If timeout information of the destinations of client request messages are stored in the server status information storage unit 330 (step 510: Yes), the request monitoring unit 305 determines that client request messages, except for some client request messages, should be timed out and a proxy timeout response process should be performed (step 530: Yes). Then, the proxy timeout response unit 335 prevents the server request messages corresponding to the client request messages decided to be timed out from being sent to the destination server apparatus 140, but sends a timeout response message indicating that the client request messages have timed out to the requesting information terminal 100 (step 535). The proxy timeout response unit 335 sends, as the timeout response message, a client response message including status code 504 (Gateway Time-out) in the HTTP protocol, for example. This prevents the proxy apparatus 220 from sending too many server request messages to destinations that are likely to cause a timeout. Therefore, connection resources can be prevented from being occupied by waiting for such server response messages for an extended time period.

Furthermore, the request monitoring unit 305 decides that some of the client request messages for which timeout information of their destinations is stored in the server status information storage unit 330 (step 510: Yes) should not be timed out (step 530: No). The proxy apparatus 220 performs a normal request response process for the client request messages decided not to be timed out (step 520). In this way, the proxy apparatus 220 can send some of server request messages for which timeout information of their destinations is stored in the server status information storage unit 330, and can detect when the server apparatus 140 recovers and becomes able to resume normal processing of server request messages.

The request monitoring unit 305 according to the present embodiment decides not to time out a predetermined percentage of the client request messages for which timeout information of their destinations is stored in the server status information storage unit 330. The percentage may be preset by an administrator of the proxy apparatus 220 or may be dynamically set or adjusted by the passing request quantity adjusting unit 380.

In particular, the passing request quantity adjusting unit 380 may reduce the percentage compared to the case where the number of request jobs is small if the number of request jobs counted by the request job counting unit 370 is relatively large. Thus, if the proxy apparatus 220 is using many of its connection resources, the passing request quantity adjusting unit 380 can reduce the percentage of server request messages sent to server apparatuses 140 which are likely to time out. Consequently, the efficiency of access processing by the proxy apparatus 220 can be improved.

If the statistic of size of server response messages received from the destination of the server request message of interest which is measured by the response size measuring unit 375 is relatively great, the passing request quantity adjusting unit 380 also reduces the above-mentioned percentage compared to the case where the size is smaller. In this way, the percentage of server request messages that are sent to server apparatuses 140 that are likely to return a large amount of data can be reduced. Consequently, the efficiency of access processing by the proxy apparatus 220 can be improved.

If timeout information of the destination is stored in the server status information storage unit 330 and a preset time period has elapsed since a server request message was sent to that destination server apparatus 140, the request monitoring unit 305 may decide not to time out a client request message. Thus, the request monitoring unit 305 can send the server request message to that destination after an interval longer than the preset time period and can check to see whether the destination server apparatus 140 has recovered at proper intervals. Consequently, the percentage of server request messages that are sent to the server apparatus 140 can be reduced. Like the percentage described earlier, the time period may be dynamically reduced or increased by the passing request quantity adjusting unit 380.

Only when the number of passing jobs counted by passing job counting unit 365 is less than or equal to a predetermined upper limit, the request monitoring unit 305 may decide not to time out the client request messages for which timeout information of their destinations is stored in the server status information storage unit 330. In this way, the number of server request messages that are likely to time out but are sent to the server apparatus 140 can be prevented from exceeding the upper limit. Thus, connection resources can be prevented from being occupied by such server request message for an extended time period and therefore server request messages destined to properly operating server apparatuses are not precluded from being sent. The upper limit, like the percentage described earlier, can be dynamically increased or reduced by the passing request quantity adjusting unit 380.

If the received client request message is a resent message (step 505: Yes) and the original client request message was directed to a different proxy apparatus 220 (step 540: Yes), the recovering unit 385 redirects the resent client request message to that different proxy apparatus 220 (step 550). On the other hand, if the original client request message was directed to the own proxy apparatus 220 (step 540: No) and a client response message to that client request message is already stored in the response message storage unit 355 (step 545: Yes), the proxy response unit 360 reads that client response message from the response message storage unit 355 and returns it to the requesting information terminal 100 through the response sending unit 340. If the client response message is not stored in the response message storage unit 355 (step 540: No, step 545: No), the request monitoring unit 305 proceeds to step 510 and performs step 510 and causes the subsequent steps to be performed for the resent client request message.

In this way, if a first client request message times out or delays, the proxy apparatus 220 stores the timeout or delay information of the destination of the server request message in the server status information storage unit 330. If the proxy apparatus 220 subsequently receives a second client request message and timeout or delay information of the second client request message is stored in the server status information storage unit 330, the proxy apparatus 220 performs a proxy timeout response process or proxy response process, instead of a normal response process. In this way, if the service level of the server apparatus 140 is degraded, the proxy apparatus 220 performs an appropriate response process according to the degree of service level reduction without wasting its connection resources, and therefore can efficiently handle access to server apparatuses 140.

Figure 5:
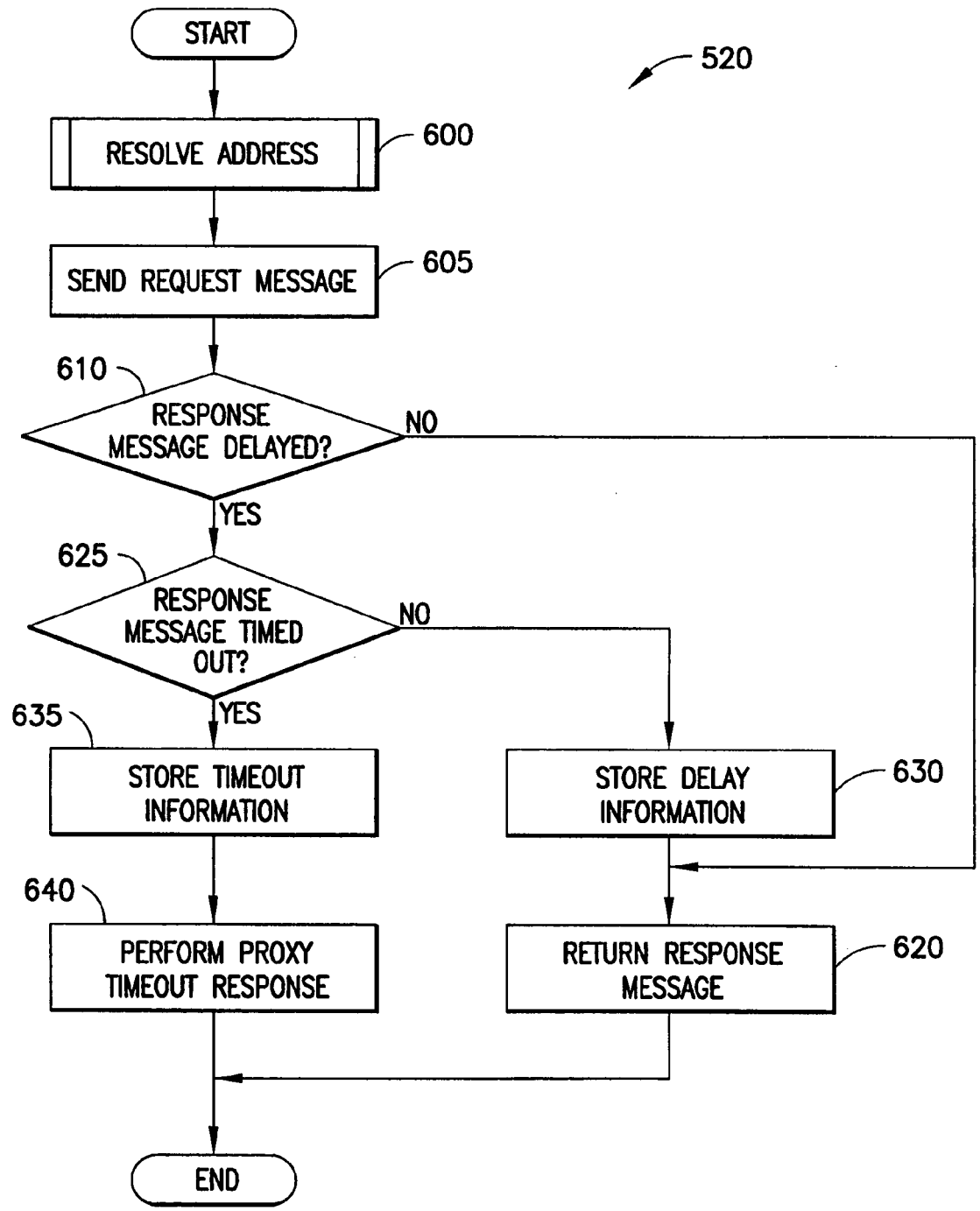
FIG. 5 shows a normal request response process flow in the proxy system 160 according to the embodiment of the present invention.

FIG. 5 shows a flow of the normal request response process performed at step 520 shown in FIG. 4.

The proxy apparatus 220 performs the proxy response process for client request messages for which delay information or timeout information of their destinations is not stored in the server status information storage unit 330 and for client request messages for which timeout information of their destinations is stored in the server status information storage unit 330 and which has been decided by the request monitoring unit 305 not to be timed out.

First, the recovering unit 385 converts the host name of the destination of a server request message corresponding to a client request message decided to be sent to a server apparatus 140 into an IP address (step 600). Then, the request sending unit 310 receives the client request message from the request monitoring unit 305 and the IP address of the destination from the recovering unit 385 and sends the server request message based on the client request message to the destination server apparatus 140 (step 605). Once the server request message is sent, the response monitoring unit 315 starts monitoring the reception of a server response message corresponding to the server request message. The request job counting unit 370 increments the number of request jobs.

Then, the timeout detecting unit 320 and the delay detecting unit 325 detect whether a delay in arrival of the server request message or the timeout of the server request message has occurred (steps 610 and 625). If a server response message to the server request message sent to the destination server apparatus 140 is received within a preset delay time (step 610: No), then the response sending unit 340 returns a client response message based on the server response message to the requesting information terminal 100 (step 620).

On the other hand, if a delay in arrival of the server request message is detected (step 610: Yes, step 625: No), the server status information storage unit 330 stores, in association with the destination of the server request message, delay information indicating that the server request messages directed to the destination has delayed (step 630). Then, the response sending unit 340 returns a client response message based on the server response message received by the response receiving unit 350 to the requesting information terminal 100 (step 620).

If the timeout of the server request message is detected (step 610: Yes, step 625: Yes), then the server status information storage unit 330 stores, in association with the destination of the server request message, timeout information indicating that the server request message directed to the destination has timed out (step 635). Then, the proxy timeout response unit 335 receives information about the client request message corresponding to the timed-out server request message from the request monitoring unit 305 and performs the proxy timeout response by sending a timeout response message indicating that the client request message has timed out to the requesting information terminal 100 (step 640).

If a server response message is received at step 610 or step 625 and if the timeout of the server request message is detected at step 625, the response monitoring unit 315 ends monitoring the reception of the server response message and the request job counting unit 370 decrements the number of request jobs.

In this way, the proxy apparatus 220 can store low-service-level information based on the service level of the destination of the server request message in the server status information storage unit 330.

Figure 6:
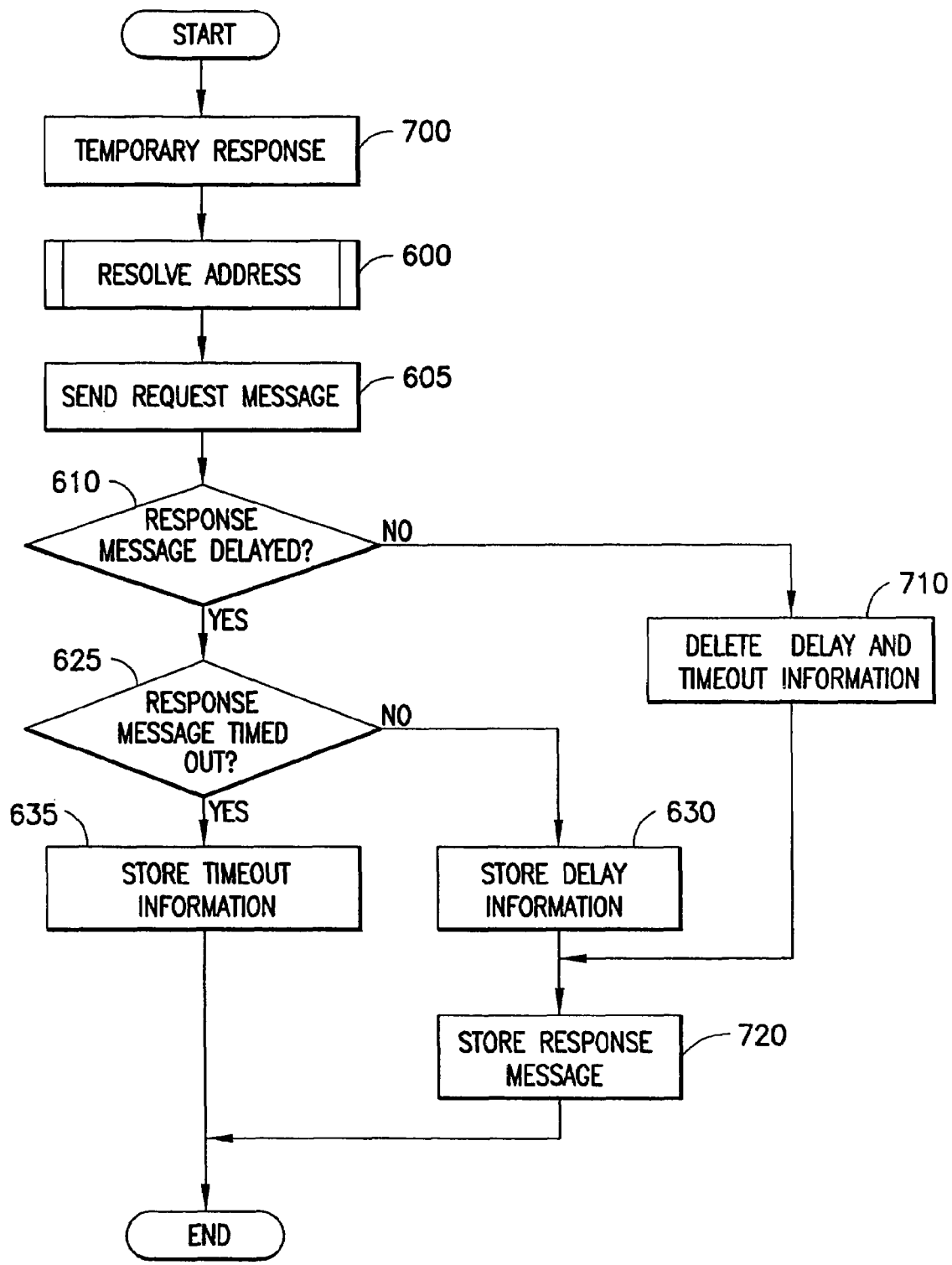
FIG. 6 shows a proxy response process flow in the proxy system 160 according to the embodiment of the present invention.

FIG. 6 shows a flow of the proxy response process performed at step 525 shown in FIG. 4. In FIG. 6, the process steps labeled with the same reference numerals as those in FIG. 5 are the same as those in FIG. 5, therefore the description of which will be omitted but only differences will be described below.

The proxy apparatus 220 performs the proxy response process for client request messages for which delay information of their destinations is stored in the server status information storage unit 330 and some of the client request messages which are resent when a server response message has not been received from the server apparatus 140.

In the proxy response process, the temporary response unit 345 sends a temporary response message to the requesting information terminal 100 through the response sending unit 340 (step 700). When doing this, the temporary response unit 345 includes, in the temporary response message, resend identification information to be included in a client request message to be resent, so that the client request message resent can be identified. The temporary response unit 345 sends as the temporary response message a response message including status code 307 (Temporary Redirect) in the HTTP protocol, for example. Alternatively, the temporary response unit 345 may send a response message including status code 304 (Not Modified).

Then, the recovering unit 385 converts the host name of the destination of a server request messages corresponding to the client request message decided to be resent into an IP address (step 600), as in step 600 in FIG. 5. The request sending unit 310 receives the client request message from the request monitoring unit 305 as in step 605 in FIG. 5 and the IP address of the destination from the recovering unit 385 and sends a server request message based on the client request message to the destination server apparatus 140 (step 605). After a server request message for which timeout information concerning its destination is stored in the server status information storage unit 330 is sent, the passing job counting unit 365 increments the number of passing jobs.

The timeout detecting unit 320 and the delay detecting unit 325 detect whether a delay in arrival of the server request message or the timeout of the server request message has occurred (steps 610 and 625), as in steps 610 and 625 in FIG. 5. If a server response message to the server request message has been received without delay or timeout (step 610: No), the response monitoring unit 315 deletes delay information or timeout information stored in the server status information storage unit 330 in association with the destination, if any (step 710). If the server response message is received within a preset delay time (step 610: No), the response message storage unit 355 stores the client response message corresponding to the server response message (step 720). Consequently, the proxy response unit 360 can return the client response message stored in the response message storage unit 355 when the client request message is resent from the information terminal 100.

On the other hand, if a delay in arrival of the server request message is detected (step 610: Yes, step 625: No), the server status information storage unit 330 stores delay information indicating that the server request message directed to the destination has delayed (step 630), as in step 630 in FIG. 5. If timeout information associated with the destination is already stored in the server status information storage unit 330, the server status information storage unit 330 deletes that timeout information. Then, the response message storage unit 355 stores the client response message corresponding to the server response message received by the response receiving unit 350 (step 720). Consequently, the proxy response unit 360 can return the client response message stored in the response message storage unit 355 when the client request message is resent from the information terminal 100.

If the timeout of the server request message is detected (step 610: Yes, step 625: Yes), the server status information storage unit 330 stores timeout information indicating that the server request message directed to the destination has timed out, in association with the destination of the server request message, as in step 635 in FIG. 5 (step 635). Consequently, the request monitoring unit 305 and the proxy timeout response unit 335 can return the timeout response message when the client request message is resent from the information terminal 100.

If a server response message is received at step 610 or step 625 and if the timeout of the server request message is detected at step 625, the response monitoring unit 315 ends monitoring the reception of the server response message and the request job counting unit 370 decrements the number of request jobs. If a server response message to a server request message decided not to time out is received or a timeout occurs at step 530 in FIG. 4, the passing job counting unit 365 decrements the number of passing jobs.

As has been described, the proxy apparatus 220 can free the information terminal 100 from a waiting state for a response from a destination that is likely to cause a delay, can reliably obtain a server response message and return a client response message to the information terminal 100 even if the information terminal 100 is placed under poor communication conditions.

FIG. 7 shows an example of the contents of a temporary response in the proxy system 160 according to the present embodiment.

FIG. 7(a) shows an example of the content of a client request message sent by an information terminal 100. In this example, the information terminal 100 sends a request conforming to the HTTP protocol.

FIG. 7(b) shows an example of a temporary response message with a Location response header. When receiving a client response request including the request shown in FIG. 7 (a), the temporary response unit 345 returns a temporary response message containing the response shown in FIG. 7(b). In particular, the temporary response unit 345 includes in the temporary response message, "proxy_redirected=server ID", which is an example of resend identification information to be included in a client request message resent by the information terminal 100. The temporary response unit 345 also includes a "server ID", which is the identifier of the proxy apparatus 220, in the temporary response message. In response to this temporary response message, the information terminal 100 resends a client request message containing "proxy_redirected=server ID", which includes the resend identification information and the identifier of the proxy apparatus 200.

Consequently, at step 505 in FIG. 4, if the client request message received includes "proxy_redirected=", the request monitoring unit 305 can determine that the client request message has been resent. If the client request message received from the information terminal 100 includes resend identification information (step 505: Yes) and also includes the identifier of the proxy apparatus 220 (step 540: No), the proxy response unit 360 can return the client response message stored in the response message storage unit 355 (step 555).

At step 540 in FIG. 4, if the received client request message includes the "server ID" of a proxy apparatus 220 different from the own proxy apparatus 220, then the recovering unit 385 can determine that the original client request message was directed to another proxy apparatus 220. If the client request message received from the information terminal 100 includes resend identification information (step 505: Yes) and does not include the identifier of the own proxy apparatus 220 (step 540: No), the recovering unit 385 can redirect the client request message to the proxy apparatus 220 identified by the identifier of the proxy apparatus 220 included in the client request message (step 550).

FIG. 7(c) shows an example of a temporary response message for directing the information terminal 100 to automatically reread a page. When a client request message containing the request shown in FIG. 7(a) is received, the temporary response unit 345 may return a temporary response message containing the response shown in FIG. 7(c). That is, the temporary response unit 345 includes "proxy_redirected=server ID", which is an example of resend identification information, in the temporary response message. The temporary response unit 345 also includes a "server ID", which is the identifier of the own proxy apparatus 220, in the temporary response message. Also, the temporary response unit 345 includes "n;", which is an example of waiting-time-specifying information that specifies waiting time before the second client request message is resent (where n is time in seconds elapses until the resend), in the temporary response message. N seconds after the information terminal 100 receives an HTML-formatted temporary response message containing the response shown in FIG. 7(c), the information terminal 100 resends the client request message containing "proxy_redirected=server ID" which includes resend identification information and the identifier of the own proxy apparatus 220.

Consequently, the request monitoring unit 305 and the recovering unit 385 can properly handle the resent client request message, as in the case where the temporary response message shown in FIG. 7(b) is used. The temporary response unit 345 may specify waiting time longer than the delay time used by the delay detecting unit 325 for detecting a delay in arrival of a server request message, in the temporary response message. Alternatively, the proxy apparatus 220 may store the elapsed time between sending of a server request message and reception of a server response message in the server status information storage unit 330 along with delay information and in association with each destination, and may specify waiting time longer than or equal to the elapsed time in the temporary response message.

Figure 8:
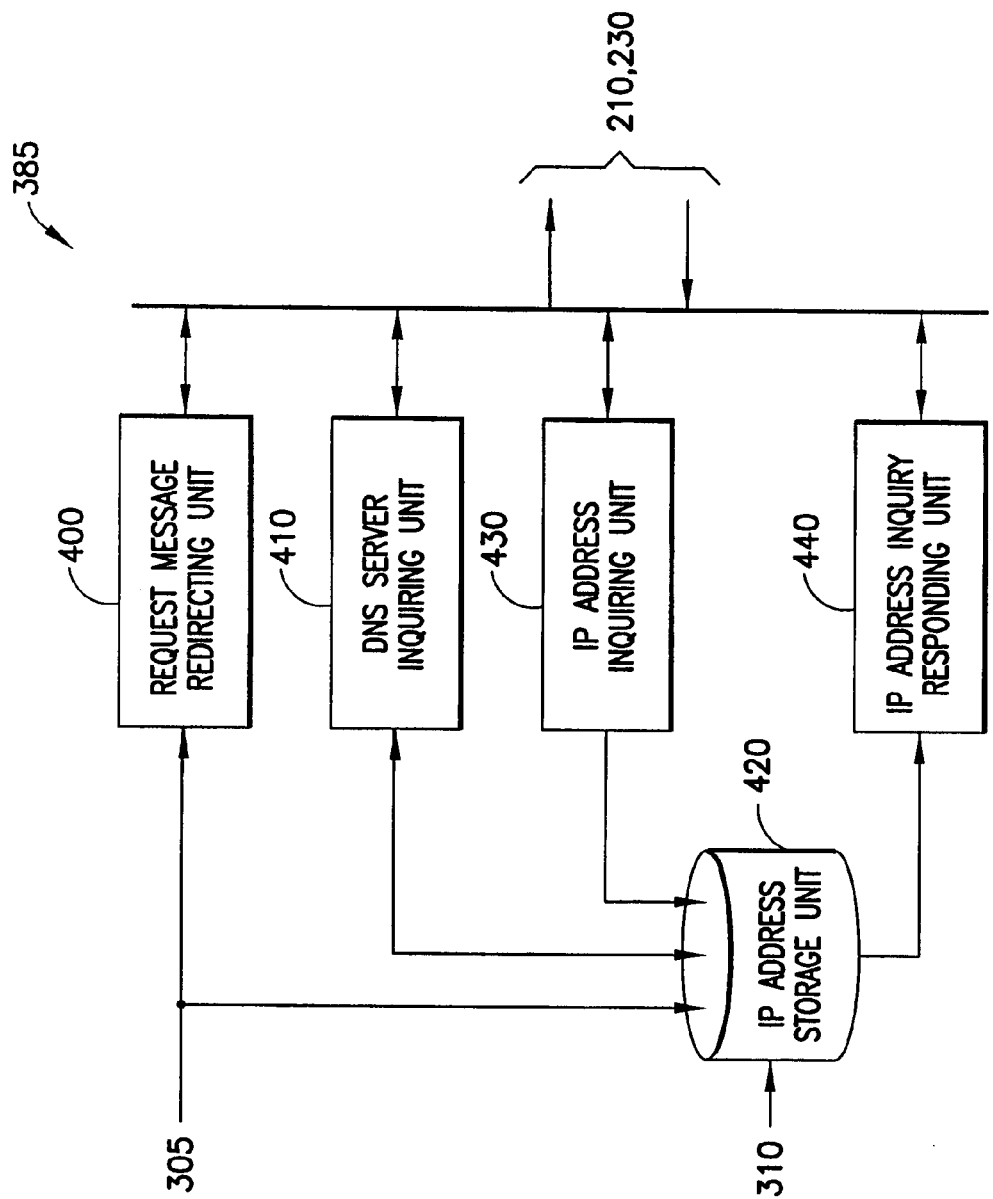
FIG. 8 shows a configuration of a recovering unit 385 according to the embodiment of the present invention.

FIG. 8 shows a configuration of the recovering unit 385 according to the present embodiment.

The recovering unit 385 includes a request message redirecting unit 400, a DNS server inquiring unit 410, an IP address storage unit 420, an IP address inquiring unit 430, and an IP address inquiry responding unit 440. If a client request message received from an information terminal 100 includes resend identification information but does not include the identifier of the own proxy apparatus 220, the request message redirecting unit 400 redirects through the first LAN 210 the client request message to another proxy apparatus 220 identified by the identifier of a proxy apparatus 220 included in the client request message. The DNS server inquiring unit 410 inquires of a DNS server the IP address corresponding to the domain name of a destination through the second LAN 230 and WAN 150 when a server request message is sent to the destination server apparatus 140. The IP address storage unit 420 stores the IP address obtained from the DNS server. The IP address inquiring unit 430 inquires of another proxy apparatus 220 within the proxy system 160 the IP address corresponding to a domain name through the second LAN 230 if address resolution requested to the DNS server has timed out. The IP address inquiry responding unit 440 returns an IP address associated with the domain name of a destination and stored in the IP address storage unit 420 if it receives an inquiry for the IP address from another proxy apparatus 220.

Figure 9:
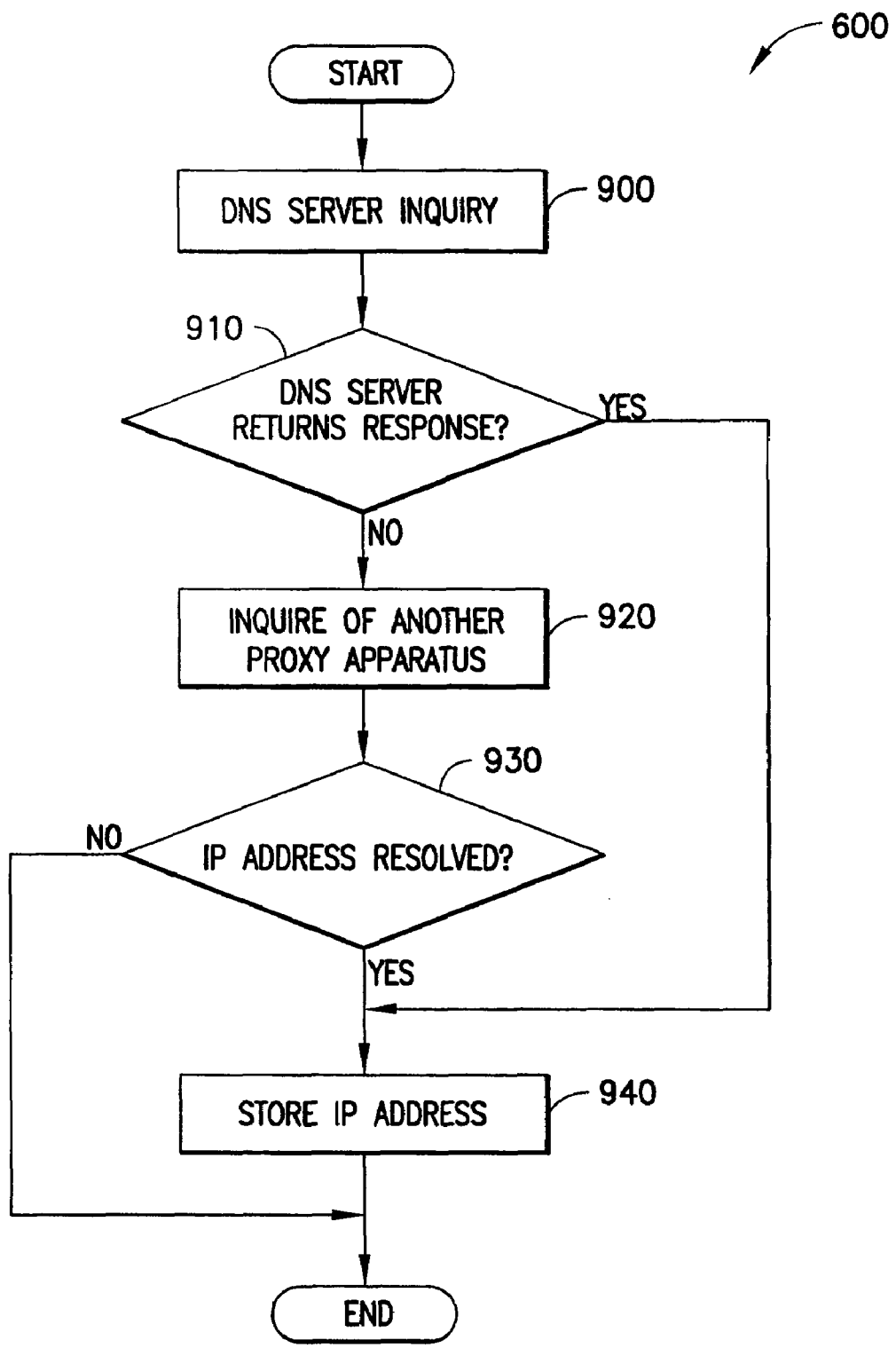
FIG. 9 shows a flow of a recovery process performed by the recovering unit 385 according to the embodiment of the present invention.

FIG. 9 shows a flow of recovery process performed by the recovering unit 385 for resolving an IP address according to the present embodiment. If the IP address corresponding to the domain name of the destination contained in a client request message received from an information terminal 100 is not stored in the IP address storage unit 420, or if the IP address stored in the IP address storage unit 420 has expired and cannot be used, the DNS server inquiring unit 410 inquires of a DNS server connected to the WAN 150 the IP address (step 900). If the IP address response is returned from the DNS server and the DNS server inquiring unit 410 can obtain the IP address (step 910: Yes), the DNS server inquiring unit 410 stores the IP address in the IP address storage unit 420 in association with the domain name and provides it to the request sending unit 310 (step 940).

On the other hand, if the inquiry sent to the DNS server times out, the IP address inquiring unit 430 sends the domain name to another proxy apparatus 220 through the second LAN 230 to inquire the IP address corresponding to the domain name (step 920). When the IP address inquiring unit 430 within that other proxy apparatus 220 receives the inquiry for the IP address corresponding to the domain name from the requesting proxy apparatus 220, the IP address inquiring unit 430 searches the IP address storage unit 420 for the IP address corresponding to the domain name. If the IP address corresponding to the domain name is stored in the IP address storage unit 420, the IP address inquiry responding unit 440 in that other proxy apparatus 220 returns that IP address corresponding to the domain name to the requesting proxy apparatus 220. Consequently, the requesting IP address inquiring unit 430 can obtain the IP address corresponding to the domain name (step 930: Yes). Then the IP address storage unit 420 stores the IP address in association with the destination domain name and provides it to the request sending unit 310 (step 940).

According to the recovery process described above, the recovering unit 385 can obtain the IP address cached on another proxy apparatus 220 and send a server request message even if the inquiry for the IP address to the DNS server times out. Therefore, in the event of a failure on the DNS server, the proxy apparatus 220 can continue access processing and prevent a backlog of access processing.

Figure 10:
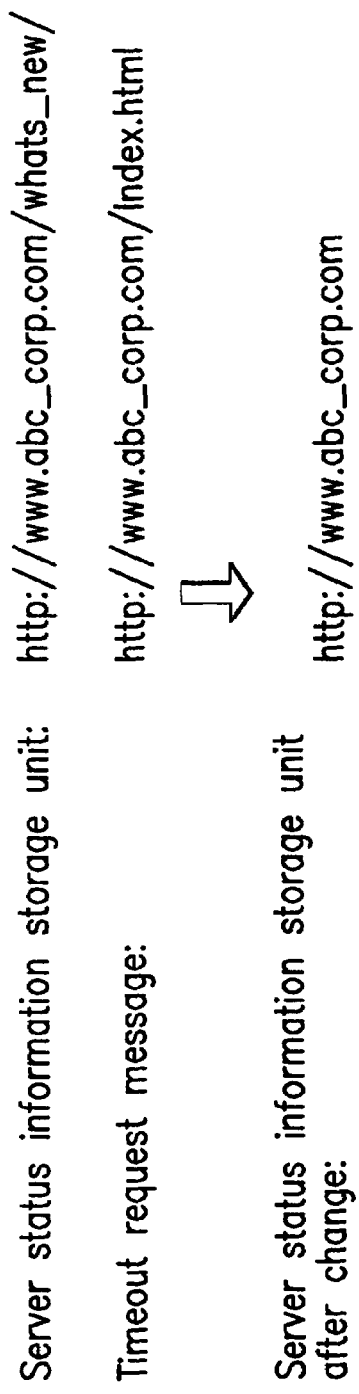
FIG. 10 shows an example of a filtering range changing method performed by a request monitoring unit 305 according to the embodiment of the present invention.

FIG. 10 shows an example of a filtering range changing method, which is performed by the request monitoring unit 305 according to the present embodiment.

First, when the timeout detecting unit 320 detects the timeout of server request message A directed to the URL_A "http://www.abc_corp.com/whats_new" of a destination, the timeout detecting unit 320 causes the server status information storage unit 330 to associate and store timeout information with the URL specifying the destination. This allows the request monitoring unit 305 to decide that a proxy timeout response should be performed for a client request message directed to the directory "whats_new" on the host having the name "www.abc_corp.com".

If the timeout detecting unit 320 subsequently detects the timeout of another server request message B that specifies the URL_B "http://www.abc_corp.com/index.html", which includes the same host name "www.abc_corp.com" as that of the destination of server request message A, the server status information storage unit 330 changes the range of the address it associates with the timeout information to a range that is common to the server request messages A and B, and stores it. In particular, the server status information storage unit 330 associates the timeout information for URL_A with at least a portion of a part common to URL_A and URL_B, that is, "http://www.abc_corp.com" based on a direction from the timeout detecting unit 320.

Thus, if another client request message that includes the destination URL "http://www.abc_corp.com" is received from an information terminal 100, the request monitoring unit 305 decides to time out the client request message. That is, if a server request message directed to a resource, such as a file, directory, or application program, on a server apparatus 140 times out, the proxy apparatus 220 stores the timeout information in association with that file, directory, or application program. If subsequently another server request message directed to another file, directory, or application program on the same server apparatus 140 times out, the proxy apparatus 220 re-associates the timeout information with the host, directory, or application program included within the portion of the address that is common to the server request messages that have timed out, and re-stores them.

According to the process described above, if server request messages directed to multiple URLs including the same host name time out, the proxy apparatus 220 can determine that a problem has occurred within a range common to the multiple URLs and can set an appropriate range of the address for which it stores the timeout information.

Figure 11:
FIG. 11 shows another example of a filtering range changing method performed by a passing request quantity adjusting unit 380 according to the embodiment of the present invention.

FIG. 11 shows another example of the filtering range changing method, which is performed by the passing request quantity adjusting unit 380 according to the present embodiment.

First, if the timeout detecting unit 320 detects the timeout of a server request message directed to the URL "http://www.abc_corp.com/shopping/search.php?user=sample", the timeout detecting unit 320 causes the server status information storage unit 330 to store the timeout information in association with the URL. If the number of request jobs is relatively great, the passing request quantity adjusting unit 380 changes the comparison range of URLs stored in the server status information storage unit 330 so that more client request messages time out than the case where the number of request jobs is smaller.

For example, as the number of request jobs increases, the passing request quantity adjusting unit 380 changes the comparison range of the URL from "http://www.abc_corp.com/shopping/search.php?user=sample" to "http://www.abc_corp.com/shopping/search.php" to "http://www.abc_corp.com/shopping" to "http://www.abc_corp.com" so as to drop lower-level character strings to loosen the limitation. Consequently, the passing request quantity adjusting unit 380 can allow the destination URLs of more client request messages to match the URL of interest and thereby time out the messages.

Then, if a portion of a URL associated with timeout information that corresponds to the comparison range specified by the passing request quantity adjusting unit 380 is included in a URL specified in a client request message, the request monitoring unit 305 decides to time out the client request message. That is, the request monitoring unit 305 compares the destination address of the newly received client request message with the range, among the ranges "a process with the same parameter in the same server application on the same server apparatus 140 as the destination associated with the timeout information", "the same server application on the same server apparatus 140 as the destination associated with the timeout information", "the same directory on the same server apparatus 140 as the destination associated with the timeout information", and "the same server apparatus 140 as the destination associated with the timeout information", that corresponds to the comparison range specified by the passing request quantity adjusting unit 380, to determine whether or not the client request message should be timed out.

Thus, when the proxy apparatus 220 is heavily loaded with requests, it can perform more proxy timeout responses to reduce the load due to the requests waiting for timeout. In this way, the proxy apparatus 220 can select an appropriate access processing according to load conditions.

The request monitoring unit 305 and/or the passing request quantity adjusting unit 380 may change the comparison range of URLs according to the number of passing jobs counted by the passing job counting unit 365 or the size of server response messages calculated by the response size measuring unit 375, instead of the number of request jobs.

Figure 12:
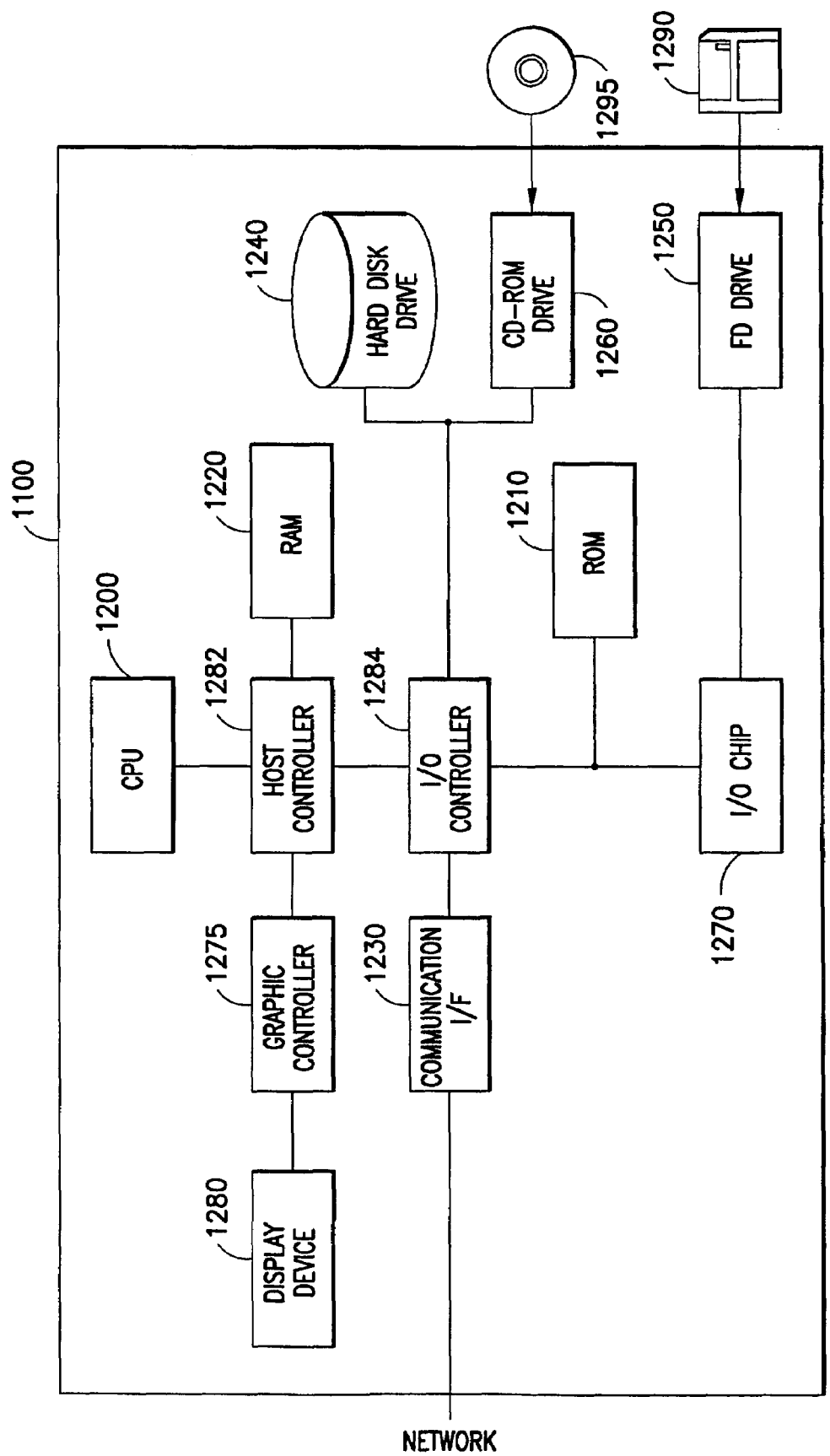
FIG. 12 shows an exemplary hardware configuration of a computer 1100 according to the embodiment of the present invention.

FIG. 12 shows an exemplary hardware configuration of a computer 1100 related to the present embodiment. The computer 1100 related to the present embodiment includes a CPU section including a CPU 1200, a RAM 1220, a graphic controller 1275, and display device 1280 interconnected through a host controller 1282, an input-output section including a communication interface 1230, a hard disk drive 1240, and a CD-ROM drive 1260, which are connected to the host controller 1282 through an input-output controller 1284, and a legacy input-output section including a ROM 1210, a flexible-disk drive 1250, an input-output chip 1270, which are connected to the input-output controller 1284.

The host controller 1282 connects the RAM 1220 with the CPU 1200 and the graphic controller 1275, which access the RAM 1220 at higher transfer rates. The CPU 1200 operates according to programs stored in the ROM 1210 and the RAM 1220 to control components of the computer. The graphic controller 1275 obtains image data generated by the CPU 1200 on a frame buffer provided in the RAM 1220 and causes it to be displayed on the display device 1280. Alternatively, the graphic controller 1275 may contain a frame buffer for storing image data generated by the CPU 1200.

The input-output controller 1284 connects the host controller 1282 with the communication interface 1230, the hard disk drive 1240, and the CD-ROM drive 1260, which are relatively fast input-output devices. The communication interface 1230 communicates with external devices through a network. The hard disk drive 1240 stores programs and data used by the CPU 1200 in the computer 1100. The CD-ROM drive 1260 reads a program or data from a CD-ROM 1295 and provides it to the hard disk drive 1240 through the RAM 1220.

Connected to the input-output controller 1284 are the ROM 1210 and relatively slow input-output devices such as the flexible-disk drive 1250 and input-output chip 1270. The ROM 1210 stores a boot program executed by the computer 1100 during boot-up and programs dependent on the hardware of the computer 1100. The flexible-disk drive 1250 reads a program or data from a flexible disk 1290 and provides it to the hard disk drive 1240 through the RAM 1220. Connected to the input-output chip 1270 are a flexible-disk drive 1250 and input-output devices through ports such as a parallel port, serial port, keyboard port, and mouse port, for example.

A program to be provided to the hard disk drive 1240 through the RAM 1220 is stored on a recording medium such as a flexible disk 1290, a CD-ROM 1295, or an IC card and provided by a user. The program is read from the recording medium, installed in the hard disk drive 1240 in the computer 1100 through the RAM 1220 and executed in the CPU 1200.

The program that is installed in the computer 1100 and causes the computer 1100 to function as a proxy apparatus 220 includes a request receiving module, a request monitoring module, a request sending module, a response monitoring module, a timeout detecting module, a delay detecting module, a server status managing module, a proxy timeout response module, a response sending module, a temporary response module, a response receiving module, a response message managing module, a proxy response module, a passing job counting module, a request job counting module, a response size measuring module, a passing request quantity adjusting module, and a recovering module. These programs or modules control the CPU 1200 and other components to cause the computer 1100 to function as the request receiving unit 300, request monitoring unit 305, request sending unit 310, response monitoring unit 315, timeout detecting unit 320, delay detecting unit 325, server status information storage unit 330, proxy timeout response unit 335, response sending unit 340, temporary response unit 345, response receiving unit 350, response message storage unit 355, proxy response unit 360, passing job counting unit 365, request job counting unit 370, response size measuring unit 375, passing request quantity adjusting unit 380, and recovering unit 385.

The recovering module includes a request message redirecting module, a DNS server inquiring module, an IP address managing module, an IP address inquiring module, and an IP address inquiry responding module. These programs or modules control the CPU 1200 and other components to cause the computer 1100 to function as the request message redirecting unit 400, DNS server inquiring unit 410, IP address storage unit 420, IP address inquiring unit 430, and IP address inquiry responding unit 440.

The programs or modules described above may be stored in an external storage medium. The storage medium may be a flexible disk 1290 or a CD-ROM 1295, or an optical recording medium such as a DVD and CD, a magneto-optical recording medium such as an MO, a tape medium, or a semiconductor memory such as an IC card. Alternatively, a storage device such as a hard disk or a RAM provided in a server system connected to a private communication network or the Internet may be used as the recording medium and the programs may be provided from the storage device to the computer 1100 over the network.

While the present invention has been described with respect to embodiments thereof, the technical scope of the present invention is not limited to that described with the embodiments. It will be apparent to those skilled in the art that various modifications or improvements can be made to the embodiment. It will be apparent from the Claims that embodiments to which such modifications and improvements are made also fall within the scope of the technical scope of the present invention.

What is claimed is:

1. An information processing apparatus, comprising:
a request sending unit for sending, to a first destination server apparatus, a first server request message based on a first client request message received from a first requesting apparatus;
a server status storage unit for storing, in response to a detection of a timeout of said first server request message, timeout information indicating that said server request message to be sent to said destination server apparatus has been timed out;
a request monitoring unit for deciding, if said timeout information of a destination of a second client request message received from a second requesting apparatus is stored in said server status information storage unit, to time out said second client request message;
a proxy timeout response unit for sending, instead of sending a second server request message corresponding to said second client request message that is decided to be timed out to a second destination server apparatus, a timeout response message indicating that said second client request message has been timed out to said second requesting apparatus,
the timeout response message including a client response message wherein the client response message includes a status code of the second destination server apparatus;
a passing request quantity adjusting unit for determining whether the second client request message is likely to time out based on an amount of data in the second client request message; and
a response monitoring unit that, if said information processing apparatus has received a second server response message corresponding to said second server request message sent to said second destination server apparatus, deletes said timeout information associated with said second server request message sent to said second destination server apparatus and stored in said server status information storage unit, wherein said request monitoring unit decides not to time out a predetermined percentage of said plurality of second client request messages for which said timeout information of their destinations is stored in said server status information storage unit;
a request job counting unit for counting request jobs, the number of said request jobs representing the number of server request messages that have been sent to said destination server apparatus and whose corresponding server response messages have not been received; and
the passing request quantity adjusting unit for reducing said percentage compared to the case where the number of request jobs is larger than a threshold quantity.

2. The information processing apparatus according to claim 1, further comprising:
a response size measuring unit for taking statistics on the size of server response messages received from each destination server apparatus; and
the passing request quantity adjusting unit for reducing said percentage compared to the case where the size is smaller if said size is relatively large.

3. The information processing apparatus according to claim 1, wherein said request monitoring unit decides not to time out said second client request message if said timeout information of said destination is stored in said server status information storage unit and a predetermined time period has elapsed since the sending of a server request message to said destination server apparatus.

4. The information processing apparatus according to claim 1, further comprising a passing job counting unit that counts passing jobs, the number of said passing jobs representing the number of second server request messages that have been sent to a destination server apparatus and whose corresponding server response messages have not been received, among said plurality of second server request messages for which said timeout information of their destinations is stored in said server status information storage unit; wherein,
if the number of said passing jobs is smaller than or equal to a predetermined upper limit, said request monitoring unit decides not to time out said second client request messages for which said timeout information concerning their destinations is stored in said server status information storage unit.

5. The information processing apparatus according to claim 1, wherein:
if a timeout of said first server request message is detected, said server status information storage unit associates with a Uniform Resource Locator specifying the destination of said first server request message and stores said timeout information indicating that said server request message for accessing said Uniform Resource Locator has timed out; and said information processing apparatus further comprises:
a request job counting unit that counts request jobs, the number of said request jobs representing the number of server request messages that have been sent to said destination server apparatus and whose corresponding server response messages have not been received; and
the passing request quantity adjusting unit wherein, if the number of said request jobs is relatively large, extends a comparison range of a Uniform Resource Locator stored in said server status information storage unit compared to the case where the number of request jobs is large; and
said request monitoring unit decides to time out said second client request message if a Uniform Resource Locator specified by said second client request message includes a part of said Uniform Resource Locators associated with said timeout information that corresponds to said comparison range specified by said passing request quantity adjusting unit.

* * * * *